United States Patent [19]

Schubert et al.

[11] Patent Number: 4,724,250

[45] Date of Patent: Feb. 9, 1988

[54] ONE-COMPONENT MOLDING MATERIAL AND ITS USE AS CONSTRUCTION MATERIAL

[75] Inventors: Bernd Schubert, Hamburg; Klaus D. Rohardt, Quickborn, both of Fed. Rep. of Germany

[73] Assignee: Mankiewicz Gebr. & Co. (GmbH & Co. KG), Hamburg, Fed. Rep. of Germany

[21] Appl. No.: 24,026

[22] Filed: Mar. 10, 1987

[30] Foreign Application Priority Data

Mar. 19, 1986 [DE] Fed. Rep. of Germany ....... 3609696

[51] Int. Cl.$^4$ .............................. C08L 75/04
[52] U.S. Cl. .................. 524/707; 106/18.16; 106/18.21; 523/310; 524/715; 524/779; 524/879
[58] Field of Search ............... 524/707, 715, 879, 779; 106/18.16, 18.21; 523/310

[56] References Cited

U.S. PATENT DOCUMENTS 4,419,401 12/1983 Pearson .................. 524/707

*Primary Examiner*—Maurice J. Welsh
*Attorney, Agent, or Firm*—Cushman, Darby & Cushman

[57] ABSTRACT

A one-component molding material based on polyisocyanato-isocyanurates and flameproofing and fireproofing agents, as well as optionally polyisocyanates, fillers and promoters is described which comprises 40 to 80% by weight of the isocyanurate of 1,6-hexamethylene diisocyanate, 0 to 20% by weight of crude MDI and/or prepolymer of polyol and crude MDI and/or isophorone diisocyanate optinally in combination with further isocyanate groups containing compounds, 5 to 20% by weight of a fireproofing mixture mainly consisting of secondary ammonium phosphate, 0 to 50% by weight filler and 0 to 5% by weight promoter. This low viscosity putty-like mass which is cold-workable and is cured under the influence of moisture, especially at increased temperatures, is useful as construction material for many applications, especially for the manufacture of molded components and plate elements for the construction of land, air and water vehicles. The products obtained after curing meet the highest requirements with regard to fire protection and possess excellent mechanical properties.

10 Claims, No Drawings

ONE-COMPONENT MOLDING MATERIAL AND ITS USE AS CONSTRUCTION MATERIAL

BACKGROUND OF INVENTION

The invention relates to a novel molding material based on polyisocyanato-isocyanurates and flameproofing and fireproofing agents, as well as optionally polyisocyanates, fillers and promoters, which is particularly suitable for use as construction material and especially from the fire protection standpoint leads to excellent products.

Duroplastic compounds and foams of polyurethane with isocyanate and isocyanurate components, epoxy resins (EPO resins), phenolic resins and novolaks are known, which contain flame-inhibiting additives and which constitute difficulty or nonflammable materials. In order to improve the fire resistance and achieve a low smoke density and toxicity, a large number of different formulations has been proposed. As flame-inhibiting additives are inter alia proposed $Al_2O_3 \times H_2O$, organic and inorganic phosphates or phosphonates, borates, silicates, chlorinated paraffins, halogen compounds, heavy metal salts, elementary phosphorus, polyphosphates and antimony trioxide. Reference is made in exemplified manner in this connection to U.S. Pats. Nos. 4,126,473 and 4,147,690, European Pat. No. 69 975 and DE-OS 31 05 947. A survey of the prior art appears in Becker-Braun, Kunststoffhandbuch, vol. 7, Polyurethanes, second edition, 1983, Hanser-Verlag; J. Troitzsch, Brandverhalten von Kunststoffen, Grundlagen etc., Carl Hanser-Verlag, 1982; and Polymerwerkstoffe, vol. 2, Technologie 1, H. Batzer et al., George Thieme Verlag, Stuttgart, 1984.

With individual additions or combinations of such flame-inhibiting additives in part very satisfactory results are obtained. In view of the great increase in the use of plastics, nowadays extreme demands regarding fire protection are made in the field of the conveyance of passengers through a number of standards and specifications, particularly with respect to the aircraft and car industry, as well as in ships, trains and in the building industry. This is documented in various national and international test standards, such as DIN 75200, DIN 4102, DV 899/35 (Germany), FAR 25.853, MVSS 25.853 (USA), AFNOR P 92-507 (France), etc. As it is to be expected that these standards will be made even stricter in future and apart from non-flammability, special importance will be attached to the density and toxicity of the smoke gas in the case of charring and/or fires, in 1979 the Airbus consortium drafted its own stricter standards, ATS 1000.001 and made it available to the relevant branches of industry. In the case of an estimated aircraft life of at least 15 years, this standard already takes account of future technical developments and demands (cf. TÜ 21, 1980, No. 2, February, pp 79–82 and "Die chemische Produktion", 1983, pp 50–53).

The one- and two-component molding materials presently used in the aircraft industry do not yet meet the requirements of ATS 1000.001, as can be gathered from the following table where, for comparison purposes, details are also given of a cured molding material according to the invention. The tests were carried out on sandwich components and honeycomb materials (phenolic resin honeycombs) conventionally used in aircraft construction and which were filled with molding materials and cured.

TABLE 1

Comparison of different molding materials according to ATS 1000.001
(+ satisfied, − not satisfied)

| | EPO molding material | | phenylformaldehyde resin molding material | molding material according to invention |
|---|---|---|---|---|
| | 2C | 1C* | 2C | 1C |
| Smoke density | − | − | + | + |
| Toxic pyrolysis gases | +/− | +/− | +/− | + |
| Compression strength RT | + | + | + | + |
| Compression strength 80° C. | + | + | + | + |
| Non-flammability | +/− | +/− | + | + |
| Density (<0,75) | 0,65 | 0,55 | 0,70 | 0,54 |
| Workability in Nome honeycombs | +/− | +/− | +/− | + |
| Adhesion to prepregs of: | | | | |
| Epoxy resin | + | + | − | + |
| Phenolic resin | − | − | + | + |
| Polyimide | − | − | − | + |
| Shrinkage <0.5% | − | − | − | + |
| Extraction force at points of application of force (inserts): | | | | |
| RT (requirement 1200 N) | − | ~1200 | <1000 | >2000 |
| 70° C. (requirement 1000 N) | − | <600 | <600 | >2000 |

*1C: Already compounded two-component material which at very low temperatures (−18° C.) is stable over extended periods of time (about 3 months).

In the aircraft industry such molding materials are e.g. used for producing reinforcements and mountings (inserts), internal coverings (e.g. side walls and partitions, as well as roof coverings), floors, insulating and covering plates, as well as molded parts. Particular preference is given to the use of so-called prepreg components (sandwich honeycomb constructions), which are constituted by phenolic resin honeycombs coated with multilayer resin mats (trade name Nomex). The resin mats (prepregs) comprise E-glass fabrics, which are impregnated with resins based on phenol/formaldehyde, unsaturated polyesters, EPO and polyimides. With a view to increasing stability and saving edging profiles, an edge filling mass is often pressed into the honeycombs on the edges of the sandwich components.

A molding material able to satisfy demands in the foreseeable future must cure without shrinkage and lead to a construction material with a low density of approximately 0.2 to 0.8 g/cm³, which ensures high bending and compression strengths both at ambient temperature and under continuous thermal influences up to 80° or 130° C. To this must be added the demands in connection with fire and/or charring, namely non-flammability, no dripping, insignificant smoke gas emission and substantially non-toxic pyrolysis gas evolution. For special uses (e.g. fire protection walls in the transportation area of aircraft) higher thermal stability would also be necessary, i.e. the material must be able to withstand e.g. a temperature of 1000° to 1200° C. for 10 minutes. With regards to the conventional composite systems in which such molding materials are used, there must be an optimum connection or adhesion with the materials forming the basis of such composite systems, such as polymers, polycondensates or polyaddition compounds (e.g. unsaturated polyesters, EPO resins, phenolic resins, polyimide or polyurethane). It is necessary or at least desirable to also have an optimum connection or adhesion to metals and materials such as glass and carbon fibres.

The formulations and systems known from the prior art, which are described in numerous patent specifications and applications, only partly fulfil certain of the above requirements or combinations of partial ranges thereof.

Thus, European Patent application 157 143 describes fire-inhibiting sealing compounds, which comprise melamines and a number of fillers which, apart from other inadequacies, have densities of 0.7 to 1.0 g/cm³.

DE-OS 35 19 581 describes ablation coatings of amine-cured EPO and polysulphide resin mixtures with pre-ox-carbon fibres as a reinforcement which, although resistant to high temperatures, have densities well above 1.0 g/cm³.

DE-OS No. 27 14 006, DE-OS No. 27 13 984 and DE-OS No. 27 40 504 describe molding materials comprising polyisocyanate and hollow spheres. These are cured through access of atmospheric humidity and optionally after addition of water. Preferably, shortly prior to processing phosphoric acid and/or phosphates or their aqueous solutions or alkali silicate solutions are added. The molding materials described in these patent applications only have a relatively low compression strength in the cured state and are only storage-stable in the form of premixes constituted by polyisocyanates and hollow spheres. However, they are not stable as moisture-curing one-component materials and therefore do not have the processing advantages linked with the latter. Tests have revealed that e.g. mixtures of hollow spheres with 2% polyisocyanates do not give stable materials. Materials produced according to the process of claim 2 of DE-OS No. 27 14 006 (plates with a thickness of 5 to 10 mm) were unable to withstand a temperature of 1080° C. for one minute.

OBJECTS OF THE INVENTION

Therefore it is an object of this invention to provide a molding material which obviates the aforementioned disadvantages of the known molding materials and to obtain improvements to the characteristics, particularly in the fire protection field.

It is a further object of this invention to provide molding materials as one-component materials which, apart from the aforementioned characteristics in the cured state have high compression strength characteristics not only at ambient temperature, but also at elevated temperatures up to 80° C., meet very high demands regarding flammability, smoke gas density and the evolution of toxic pyrolysis gases in the case of charring and/or fire, do not afterflame, do not drip, are resistant to water, hydraulic fluid and kerosene, provide excellent binding to any standard prepreg materials, metals and fibrous materials and cure in shrinkage-free manner.

These and further objects will become apparent as the description of the invention proceeds.

DETAILED DESCRIPTION OF INVENTION

The invention is directed to a one-component molding material and its use as construction material, especially fire protection construction material as described herein and in the dependent claims.

The molding material according to the invention is a one-component molding material base on polyisocyanato-isocyanurates and flameproofing and fireproofing agents as well as optionally polyisocyanates, fillers and promoters comprising:
(A) 40 to 80% by weight of the isocyanurate of 1,6-hexamethylene diisocyanate with a NCO content of 18 to 24% by weight,
(B) 0 to 20% by weight of crude MDI and/or prepolymer of polyol and crude MDI and/or isophorone diisocyanate optionally in combination with dimerized triazine of TDI, copolymerized triazine of TDI and HDI and/or napthalene diisocyanate,
(C) 5 to 20% by weight of a mixture of:
  (a) 50 to 100% by weight of secondary ammonium phosphate with the proviso that the amount of secondary ammonium phosphate is 80 to 100% by weight if component C is only present in an amount of 5 to 10% by weight,
  (b) 0 to 20% by weight of primary ammonium phosphate,
  (c) 0 to 20% by weight of zeolite and/or crystalline alkali silicate,
  (d) 0 to 20% by weight of finely divided silica,
  (e) 0 to 20% by weight of $Ca_3(PO_4)_2$,
  (f) 0 to 20% by weight azodicarbonamide,
  (g) 0 to 20% by weight calcined calcium oxide,
(D) 0 to 50% by weight of filler and
(E) 0 to 5% by weight promoter.

Component A is the isocyanurate of 1,6-hexamethylene diisocyanate. In the preferred case of the ideally trimerized 1,6-hexamethylene isocyanurate it is a polyisocyanate-isocyanurate with the following formula:

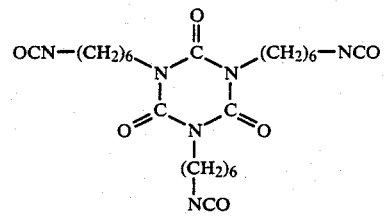

Obviously the crosslinking products resulting from this compound are also suitable. The isocyanurate of 1,6-hexamethylene diisocyanate is commercially available and normally contains less than 0.5% by weight of monomeric 1,6-hexamethylene diisocyanate. The NCO content is 18 to 24% by weight and preferably 20 to 22% by weight. Conventionally the density is about 1.2 g/cm³ and the viscosity about 1000 to 3000 mPas, maintaining a suitable viscosity obviously being important from the processing standpoint. The content of the preferred ideally trimerized 1,6-hexamethylene diisocyanate differs in the various commercial products and can be e.g. 98% and higher.

The "crude MDI" consists of polyisocyanates based on diphenyl methane diisocyanate, as produced by aniline-form-aldehyde condensation and subsequent phosgenation. Volatile constituents and part of the diphenyl methane diisocyanate formed are distilled off. Thus, crude MDI is a polyisocyanate from the bottom of the technical production or distillation of diphenyl methane diisocyanate (cf. e.g. DE-OS No. 27 14 006, pp 9, 18 and especially 28; Kunststoffhandbuch, vol. 7, Polyurethane, second edition 1983, p 63). It is advantageous according to the invention if the crude MDI has a high functionality, i.e. the NCO content of the crude MDI is advantageously 28 to 33% by weight, although it is also possible to use materials with a lower NCO content, such as e.g. 20% by weight. The density (20° C.) of crude MDI is normally $1.2\pm0.1$ g/cm$^3$, whilst the viscosity is normally about 130 mPas.

In place of crude MDI, component B can also be constituted by a prepolymer obtained by reacting crude MDI with polyol in known manner. Polyols suitable for the production of prepolymers are known to the expert and therefore require no further illustration (cf. e.g. DE-OS No. 27 14 006, p 10 ff).

Instead of crude MDI or prepolymer of polyol and crude MDI or in combination with crude MDI or prepolymer of polyol and crude MDI, in component B also isophorone diisocyanate (IPDI) can be used. Also this product is commercially available.

In a further preferred embodiment of the invention in component B the crude MDI and/or isophorone diisocyanate can be combined with dimerized triazine of TDI, copolymerized triazine of TDI and HDI and/or naphthalene diisocyanate (NDI), these additional ingredients being charged as solids. Dimerized triazine of TDI is commercially available, e.g. dissolved in ethyl or butyl acetate, and has the following idealized structure:

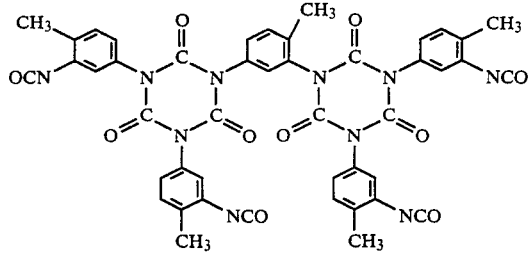

Copolymerized triazine of TDI and HDI is also commercially available dissolved in ethyl or butyl acetate and has the following idealized structure:

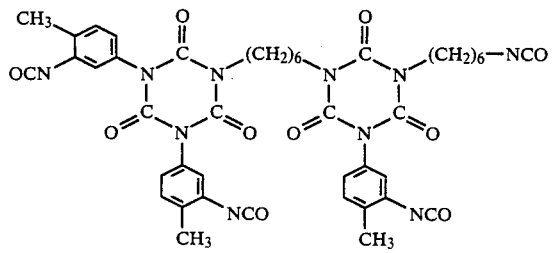

Preferably component B is present in the molding material according to the invention in an amount of 1 to 10% by weight and particularly 2 to 6% by weight, because this leads to optimum compression strength of the cured molding material.

Component C is decisively responsible for the extremely advantageous characteristics of the cured inventive molding material with respect to non-flammability. Secondary ammonium phosphate (diammonium hydrogen phosphate, $(NH_4)_2HPO_4$) can be used alone or combined with primary ammonium phosphate (ammonium dihydrogenorthophosphate, $NH_4H_2PO_4$), zeolite, particularly sodium or potassium aluminosilicates, crystalline alkali silicates, such as Na and K silicate, finely divided silica, particularly pyrogenic silica, and/or calcium orthophosphate $(Ca_3PO_4)_2)$, azodicarbonamide and/or calcined calcium oxide. The mixture consists of at least 50% and preferably at least 80% by weight secondary ammonium phosphate and up to 50% and preferably 20% by weight of the remaining components. In case only 5 to 10% by weight of component C) are present in the inventive molding material, then the amount of secondary ammonium phosphate in component C) has to be 80 to 100% by weight. Experience up to now has shown that in particular a mixture of secondary ammonium phosphate, crystalline alkali silicate, pyrogenic silica and calcium orthophosphate is suitable.

It is decisive for the storage stability of the inventive molding material that the water content of the individual components thereof amounts to no more than about 0.2% by weight, based on the molding material weight, and component C has a specific particle size distribution. The particle size of component C is preferably 0.5 to 200 $\mu$m and particularly 1 to 150 $\mu$m with a maximum at about 50 $\mu$m. Particular perference is given to a particle size distribution such that 50 to 70% by weight have a size of 20 to 50 $\mu$m, no more than 30% by weight a size of less than 20 $\mu$m and no more than 50% by weight a size in the range of 50 to 100 $\mu$m. Comparative tests have revealed that e.g. ground products with a proportion of 80% by weight under 20 $\mu$m caused catalytic surface effects on the ammonium phosphates, so that due to the evolution of ammonia a storage-stable one-component molding material was not obtainable.

The above particle size distribution applies to component C overall, but preferably also to each of its mixing components (a) to (g). To the extent that the materials used in component C are not already commercially available in the desired particle size, the particle size setting can take place in the usual way, e.g. by grinding.

The finely divided silica or calcium orthophosphate in component C mainly has a stabilizing action, so that component C can be used in the form of a free-flowing premix in the production of the inventive molding material. Suitable quantities of these components under this aspect are about 1 to 3% by weight, it being pointed out that the percentages by weight concerning the mixing constituents of component C only relate to the latter, both in the claims and in the description, i.e. the total component C corresponds to 100% by weight.

Fillers suitable for component D are practically all known fillers for such molding materials, as a function of the intended use of the inventive molding material. Examples for such fillers are talcum, stone powder, chalk, non-flammable plastic granules, inorganic solids such as CaO, Mg(OH)$_2$, Al(OH)$_3$, metal flakes, chips and powders, zeolites etc.

In view of the good results obtained therewith particular preference is given to fly ash and hollow microspheres made from glass or phenolic resins having a particle size of 5 to 200 μm and a true density of 0.15 to 0.7 g/cm$^3$. Suitable are the conventional commercial products which are known to the expert and therefore require no further explanation (with regards to hollow glass microspheres reference can e.g. be made to Kunststoffe 75, 1985, 7, pp 421 to 424). From the fire protection standpoint it is particularly preferred to use in the inventive molding material those hollow spheres which are filled with non-flammable or fire-extinguishing gases. These generally involve nitrogen and carbon dioxide, but there are also hollow spheres filled with inert gases such as argon, although they can scarcely be considered from economic standpoints.

Carbon, glass and metal fibres are also very suitable fillers. The use of carbon fibres is particularly advantageous if a high compression strength is required in the case of a low density of the cured molding material. Particularly suitable are carbon fibres and so-called pre-ox fibres formed from polyacrylonitrile (cf. e.g. DE-OS No. 35 19 581, pp 6 and 7) having a thickness of 0.001 to 0.1 mm and a length of 0.005 to 50 mm and particularly 0.1 to 5 mm. Suitable metal fibres are mainly fibres of copper and stainless steel, the latter having preferably a diameter of 4 to 12 μm and a length of 1 to 12 mm.

Other suitable fillers are silica or B$_4$C (tetraboroncarbide) with particle sizes of 1 to 70 μm.

Very suitable as filler are also aluminum flakes. Further so-called "cobweb-whiskers" have proven as extremely valuable fillers. These are fibre materials on the basis of SiO$_2$, Si, SiC and C, which consist of single fibres interlaced in the submicron and micron range. Alternatively the "cobweb-whiskers" can consist of silicon carbide fibres in admixture with silicon carbide particles (cf. e.g. the brochure of Norwegian Talc Deutschland GmbH relating to fibre additives "XEVEX" and "XPW 2").

In addition melamin resin powders, which are commercially available, have proven to be well suited fillers. The same is true for foamed clays, e.g. commercially available under the trade name "NORPRIL" cf. the data sheet of Norwegian Talc Deutschland GmbH of September 1986).

Inventive molding materials containing no component D, i.e. no filler, are suitable as non-flammable laminate resin for prepreg components. Low filler contents are advantageous if the inventive molding materials are to be processed to foams. In this context especially the use of hollow glass microspheres in a quantity of about 5 to 20% by weight has proven advantageous. In this connection, these spheres are also used for the pore regulation of the foam to be produced. The density of the hollow glass microspheres in the inventive molding material is preferably less than 0.4 g/cm$^3$.

As has been stated hereinbefore, the choice of the particular filler is dependent on the intended use of the inventive molding material. The expert is well aware of the way and to the extent he can influence the characteristics of the molding material by the choice of the fillers (cf. also the examples given hereinafter). However, it has been found that when using the molding material according to the invention the expected effects frequently occur in a surprisingly marked form and to an above-average extent.

Useful materials for component E are well known in the art. Thus it is possible to use as promoter or catalyst all known materials such as amines, dibutyl tin laurate, tin mercaptate, etc. (cf. e.g. DE-OS No. 27 14 006, pp 20 and 21 and DE-PS No. 23 10 559, column 7), preference being given to tertiary amines.

The production of the molding material according to the invention causes no particular problems and is brought about by bringing together and mixing components A and C, as well as components B, D and E, if the latter are present. It is important that moisture is substantially excluded. The inventive molding material is therefore preferably produced in an atmosphere of a dried inert gas, such as nitrogen. When using hollow microspheres, it is generally necessary to dry these beforehand, e.g. for 4 hours at 200° C. As already stated above, it is important for achieving an adequate storage stability that the water content of the individual constituents of the inventive molding material is in all no more than about 0.2% by weight.

The order in which the components of the inventive molding material are brought together is normally unimportant. When using hollow glass microspheres as filler, it has proven particularly advantageous if they are first introduced, followed by component A and/or B in random order and then the remaining constituents. As already mentioned above for component C, it is also preferred to prefabricate premix components B and C, if these components consist of mixtures of several constituents.

The mixing of the constituents forming the inventive molding material can take place in conventional means, e.g. forced kneaders, double Z forced kneaders, planetary mixers, suitable extruders, drum mixers, Nauta mixtures etc. Kneading is continued until a homogeneous mass is obtained, which can be established by inspection on a glass disk under a microscope. Generally kneading times of 3 minutes are adequate. In case of a 200 litre batch, the maximum kneading time is generally no more than 15 minutes, but generally much shorter kneading times are adequate as a function of the materials used.

The thus produced homogeneous molding material is filled with the aid of conventional presses in the usual way, e.g. into cartridges or containers (e.g. hobbocks). Filling can also take place into containers of aluminum composite film as well as of polyethylene or polypropylene, preference being given to polypropylene over polyethylene due to the lower water vapour permeability.

Unless it is coloured for practical or esthetic reasons, the inventive molding material is a colourless to white, low viscosity putty-like material, i.e. it does not flow. However, it is cold-workable and its viscosity is always high enough to enable it to be pressed into the smallest honeycombs, e.g. with a key width of 2.8 mm.

As the inventive molding material is a one-component material and as it is cold-workable, it obviously offers great processing advantages. In addition, it is moisture hardening and does not only exhibit no shrinkage during curing, but even expands. This has the important advantage that even if the mold used for curing is not filled to an optimum extent, the inventive molding material leads to products which still accurately correspond to the shape given by the mold.

Another important advantage of the inventive molding material is that it is solvent-free. This facilitates to a considerable extent the processing thereof, because in view of the ever stricter regulations protecting the environment solvent-containing molding compounds lead to considerable additional costs.

After cold shaping, the curing of the inventive molding material takes place by ramming, rolling, pressing, extruding, shaking in, blowing in, etc. at ambient or elevated temperature through the action of atmospheric humidity or water vapour. At ambient temperature curing takes place within roughly 7 days, or within a single day when adding about 1 to 3% by weight of the above mentioned promoters. However, preferably curing takes place at 110° to 200° C. (e.g. 130° C.) without promoter in about 0.5 to 3 hours. Generally there is a not inconsiderable aftercuring, so that the initially obtained compression strength, e.g. after 4 weeks can increase by about 20 to 30% and even up to 50%. When curing the inventive molding material, the expert will obviously take account of the molding geometry and thermal conductivity and will choose the necessary curing time accordingly (cf. e.g. DE-OS No. 27 14 006, p 23). Otherwise curing takes place at usual pressures, e.g. atmospheric pressure (pressures of about 0.5 to 50 bar normally being used).

As stated hereinbefore, the inventive molding material expands on curing. This makes it possible to produce cured products with different bulk densities, in that the same quantities of the inventive molding material are cured in varying volumes or different quantities of said material are cured in the same volume. In the case of a pressure of about 1 bar, it is e.g. possible in a closed mold to produce moldings with a bulk density of 500 to 600 kg/m$^3$. If more pronounced foaming is allowed during curing, moldings with even lower bulk densities are obtained. The limit with respect to rigid foams is reached with a bulk density of about 300 kg/m$^3$.

If the relative atmospheric humidity during curing is below about 40%, it is advantageous to add water in concentrations of 1 to 10% by weight, there being no need to define the water quantity. Water can be replaced by aqueous bases, such as e.g. caustic soda and caustic potash solution, or alkaline-reacting compounds, such as sodium or potassium silicates in the form of their aqueous solutions. Ammonium phosphate solutions are also very suitable. Generally 0.5 to 5 n solutions are used.

As indicated hereinbefore, the molding material according to the invention can be used in many ways, i.e. as a construction material and especially a fire protection construction material for the most varied purposes (a large number of possible applications for the inventive molding material are e.g. given in the paragraph bridging pp 25 and 26 of DE-OS No. 27 14 006). Thus, the molding material according to the invention can be used for producing foams (rigid foams with bulk densities between 150 and 300 kg/m$^3$). A particularly important use is in the production of composite systems or sandwich structures constituted by surfaces made from glass fabric or carbon fibre prepregs and cores of molding compounds or foams with bulk densities of 150 to 1000 kg/m$^3$. Particular reference is made in this connection to the processing of the inventive molding material in conjunction with the honeycomb materials especially used in aircraft building. The inventive molding material can be pressed into these honeycomb materials and then cured therein, which leads to moldings with a great hardness, compression strength and excellent fire protection characteristics.

Products with particularly good characteristics are e.g. also obtained if the inventive molding material is filled with short glass or carbon fibres of a length of 1 to 30 mm and preferably 1 to 6 mm. Suitable carbon fibres are e.g. partly oxidized polyacrylonitrile fibres (preoxfibres) or fully carbonized pitch fibres.

For many applications it is recommendable to combine the inventive molding material with glass or carbon fibre fabrics. Satin, linen, atlas, roving, unidirectional material and staple fibre fabrics are particularly suitable for this. Another suitable fabric material is constituted by aramide glass fibres or poly-(p-phenylene terephthalic amide)-carbon fibre fabric (re aramide and PPDT cf. e.g. Neue polymere Werkstoffe, 1969-1974, Carl Hanser Verlag, 1975, chapters 9.1 and 9.2). As a function of the intended use such fabrics, fleeces or braids can be filled with the inventive molding material and then cured or can be applied externally to the molding material, followed by the curing of the latter. The latter can e.g. take place in such a way that a mold is lined with one of said fabrics, fleeces or braids and then the inventive molding compound is introduced and cured. This leads to an extremely stable union between the cured molding material and the fabric, fleece or braid. The introduced fabrics and fleeces have preferably weights of 50 to 600 g/m$^2$ and mainly of 100 to 200 g/m$^2$.

As is clear from the following examples, the products produced from the molding material according to the invention have excellent non-flammability characteristics and withstand a fire test in the form of a 5 minute flame exposure (1080° C.) to the extent that no dripping, after-flaming or burning through is observed.

The inventive molding material is suitable as a filling mass and putty, as well as a coating material. However, the main use is in composite structures of fabrics and masses. Without going into detail, the most important uses are indicated: reinforcing sandwich panels and composite components in the aircraft industry, ships, railways and other vehicles (e.g. racing cars and tankers), where fire protection is required; for the car industry: engine enclosures, lining of engine cowlings for preventing carburettor fires and the like; building industry: fire inhibiting seals for wall openings, closures for manholes, airconditioning shafts, cover plates, fire protection walls, fillings for fire protection doors, or in an embodiment with a greater thickness of 30 to 50 mm as doors; linings or coverings of data protection cabinets and safes.

The products obtained with the inventive molding material following the curing thereof can be sawn, milled, drilled, nailed, screwed, bonded and mechanically worked in any other way (cf DE-OS No. 27 14 006, last paragraph on p 26, where processing examples are given which also apply to the inventive molding material).

The inventive molding material can obviously also be processed in conjunction with the conventional aids used in the present technical field and these aids can be incorporated into the molding material or e.g. added during processing and curing. These aids are known to the expert, so that there is no need to illustrate them (cf. e.g. DE-OS No. 27 14 006, pp 20 to 22).

It is pointed out in this connection that it is particularly advantageous to cure the inventive molding material in union with polycondensation products, such as phenolic resins, where splitting off water occurs. It is also of interest that a curing action is obtained with excess monomers (e.g. styrene) of the laminates (prepreg components). The interaction with e.g. styrene leads to an extremely strong connection with the laminate. The aforementioned characteristics of the inventive molding material provide a considerably difference compared with the known molding compounds (e.g. DE-OS No. 27 14 006) and the commercially available edge and core filler materials based on epoxy resin, as well as formulations with phenolic resin components (see above), which either do not fulfil the requirements of ATS 1000.001 or the necessary bonding of prepregs to polycondensation products, such as phenolic resin masses.

It is finally pointed out that the inventive molding material, after curing, has a very good attachment, adhesive strength and compatibility with all commercially available plastics and even provides usable adhesion to polyolefins, Teflon (PTFE) and the like. Satisfactory adhesive strengths are also obtained on metal, so that the filling mass according to the invention can also be used for the construction of sandwich components with metal outer surfaces and a filling mass core. Suitable metallic materials are e.g. steel, aluminum etc.

The following examples describing preferred embodiments are given for illustrative purposes only and are not meant to be a limitation on the subject invention. In all cases, unless otherwise noted, all parts and percentages are by weight.

EXAMPLE 1

A one-component molding material of components A, C and D was prepared. 45 g of commercially available isocyanurate of 1,6-hexamethylene diisocyanate with a NCO content of 21.5% (hereinafter referred to only as isocyanurate), 5 g of diammonium hydrogen phosphate $(NH_4)_2HPO_4$ and 50 g of hollow glass microspheres with a density of 0.35 $g/cm^3$ were mixed. Accompanied by the addition of about 3.2% by weight of water, the thus obtained homogeneous mixture was cured in a closed mold for 1 hour at 155° C. The bulk density of the cured product was 420 $kg/m^3$ and a compression strength at ambient temperature of 14.1 $N/mm^2$ was obtained.

EXAMPLE 2

A one-component molding material of components A, B, C and D was prepared. 52 g of isocyanurate according to Example 1, 4.5 g of crude MDI with a NCO content of approximately 31% by weight, 14.5 g of diammonium hydrogen phosphate $(NH_4)_2HPO_4$, 0.5 g of crystalline potassium silicate with a nominal pore diameter of 3 Å, 0.3 g of pyrogenic silica and 28.2 g of hollow glass microspheres with a density of 0.38 $g/cm^3$ were homogeneously mixed. Curing once again took place in a closed mold for 3 hours at 135° C. The cured product had a bulk density of 780 $kg/m^3$ and a compression strength of 62.2 $N/mm^2$ at ambient temperature or 33.1 $N/m^2$ at 80° C.

EXAMPLE 3

A one-component molding compound was prepared from components A, B, C and D. 55.5 g isocyanurate according to Example 1, 4.0 g of crude MDI, 15.0 g of diammonium hydrogen phosphate $(NH_4)_2HPO_4$, 0.9 g of $Ca_3(PO_4)_2$, 21.4 g of pre-ox fibres with a length of 3 to 6 mm were homogeneously mixed, accompanied by the addition of 3.2 g of water. Curing of the thus obtained molding material took place under the same conditions as in Example 2. The cured product had a bulk density of 800 $kg/m^3$ and a compression strength at ambient temperature of 75.1 $N/mm^2$.

EXAMPLE 4

Three molding compounds with the compositions given in the following table were prepared, using different hollow glass microspheres in different quantities and the influence of these changes in connection with filler component D was investigated with respect to the bulk density, compression strength and modulus of elasticity. The results are given in the following table.

|  | A | B | C |
|---|---|---|---|
| Isocyanurate (wt. %) | 50.0 | 52.0 | 59.0 |
| Crude MDI (wt. %) | 4.3 | 4.4 | 5.0 |
| $(NH_4)_2HPO_4$ (wt. %) | 14.7 | 15.0 | 18.0 |
| Hollow glass microspheres (wt. %) |  |  |  |
| Water (wt. %) | 4.0 | 4.0 | 4.0 |
| Bulk density ($kg/m^3$) | 700 | 540 | 490 |
| Compression strength ($N/mm^2$): |  |  |  |
| Room temperature | 57.8 | 25.2 | 16.8 |
| 50° C. | 42.7 | 21.0 | 12.2 |
| 70° C. | 31.2 | 15.4 | 10.4 |
| 80° C. | 25.8 | 12.7 | 8.9 |
| Modulus of Elasticity at RT ($N/mm^2$) | 2483 | 1852 | 1264 |

[1] Density = 0.40 $g/cm^3$
[2] Density = 0.35 $g/cm^3$
[3] Density = 0.15 $g/cm^3$

EXAMPLE 5

Five one-component molding materials were prepared, in which in each case the isocyanate components (A and B) were varied. The composition, the bulk densities obtained through curing for 3 hours at 135° C., accompanied by the addition of about 3.2% by weight of water and the compression strengths obtained can be gathered from the following table.

|  | A | B | C | D | E |
|---|---|---|---|---|---|
| Isocyanurate (wt. %) | 56.3 | — | 54.3 | 46.3 | — |
| Crude MDI (wt. %) | — | 56.3 | 2.0 | 10.0 | — |
| HDI (wt. %) | — | — | — | — | 56.3 |
| Component C[1] (wt. %) | 16.5 | 16.5 | 16.5 | 16.5 | 16.5 |
| Hollow glass microspheres (wt. %) | 27.2 | 27.2 | 27.2 | 27.2 | 27.2 |
| Bulk density ($kg/m^3$) | 610 | 590 | — | 590 | — |
| Compression strength ($N/mm^2$): |  |  |  |  |  |
| Room temperature | 21.2 | 15.6 | 20.9 | 24.2 | 12.3 |
| 80° C. | 5.8 | 6.9 | 12.9 | 13.1 | 2.8 |

[1] Component C consisted of 95% diammonium hydrogen phosphate, 3% crystalline potassium silicate having a nominal pore diameter of 3 Å and 2% pyrogenic silica. The hollow glass microspheres had a density of 0.37 $g/cm^3$.

EXAMPLE 6

Three molding compounds with different isocyanate contents and different hollow glass microsphere quantities were produced for comparing the inventive molding material with those of DE-OS No. 27 14 006. The compositions and the test results obtained are given in the following table. Curing took place for 3 hours at 130° C. after addition of 3.2% by weight of water. Component C and the hollow glass microspheres were identical with those of Example 5.

|  | A | B | C |
|---|---|---|---|
| Isocyanurate (wt. %) | — | — | 53 |
| Crude MDI (wt. %) | 29 | 2.0 | 4.6 |
| Component C (wt. %) | 1 | 1 | 16.0 |
| Hollow glass microspheres (wt. %) | 70 | 97 | 26.4 |

-continued

| | A | B | C |
|---|---|---|---|
| Bulk density (kg/m³) | 390 | 290 | 550 |
| Compression strength (N/mm²): | | | |
| Room temperature | 6.8 | 1.1 | 27.2 |
| 80° C. | 5.4 | 0.8 | 15.3 |

EXAMPLE 7

A molding material was produced from 52% by weight of isocyanurate, 5.0% by weight of crude MDI, 16.5% by weight of component C according to Example 5 and 26.5% by weight of hollow glass microspheres with a density of 0.35 g/cm³. Curing took place in a mold with a volume of 3.91 liter at a temperature of 100° C. for 2 hours, the molding compound being mixed with water in a weight ratio of 20:1 prior to curing. Five different cured products were produced, differing only through the fact that the mold was filled with different molding material quantities. The particular filling quantities and the characteristics of the cured products obtained can be gathered from the following table, products C, D and E being rigid foams.

| | A | B | C | D | E |
|---|---|---|---|---|---|
| Filling quantity (kg) | 2.15 | 1.51 | 1.26 | 1.19 | 1.02 |
| Bulk density (kg/m³) | 550 | 390 | 320 | 290 | 260 |
| Compression strength at RT (n/mm²) | 21.6 | 10.3 | 6.1 | 4.9 | 3.9 |

EXAMPLE 8

Three molding compounds with different filler combinations were produced. The compositions and the characteristics obtained after curing for 2 hours at 130° C. without water addition can be gathered from the following table.

| | A | B | C |
|---|---|---|---|
| Isocyanurate (wt. %) | 62.0 | 16.0 | 16.0 |
| Crude MDI (wt. %) | — | 48.3 | 48.3 |
| (NH₄)₂HPO₄ (wt. %) | 10 | 16.0 | 16.0 |
| Crystalline K—silicate (wt. %) | 2.0 | 2.0 | 2.0 |
| Na—silicate (wt. %) | 1.0 | — | — |
| Silica (wt. %) | — | 1.0 | 1.0 |
| Microloy[1] (wt. %) | — | 16.7 | — |
| Carbon fibres[2] (wt. %) | 5.0 | — | — |
| Hollow glass microspheres[3] (wt. %) | 20.0 | — | 16.7 |
| Bulk density (kg/m³) | 810 | 770 | 790 |
| Compression strength (N/mm²): | | | |
| Room temperature | 58.4 | 25.2 | 20.8 |
| 80° C. | 26.2 | 9.8 | 6.5 |

[1] See Kunststoffe, 75 (1985), 7, page 421
[2] Fibre length 3–6 mm
[3] The density of the hollow glass microspheres was 0.40 g/cm³ in product A and 0.35 g/cm³ in product C.

The products produced in Examples 1 to 8 were investigated for their fire behaviour. Both after 12 and 60 seconds, no after-burning in the case of flame application was observed in the case of the inventive products. After-burning only occurred in product A of Example 6. Product B of Example 6 could not be tested, because adequate strength could not be obtained.

All the tested products fulfilled the smoke gas density requirements of ATS 1000 001, except for product A of Example 6 and B and C of Example 8, which evolved a large amount of smoke gas. This also occurred in the case of product B of Example 5.

The necessary compression strengths at ambient temperature and 80° C. were not fulfilled by products A, B and E of Example 5 and A and B of Example 6.

EXAMPLE 9

Molding compounds with the composition given in the following table were produced and cured for 2 hours at 100° C. The products A, B and C were laminated on both sides with carbon fibre prepregs or with carbon fibre fabrics only and then were subjected to the flame application test at 1080° C. for 5 minutes. The carbon fibre fabric was a carbon fibre linen weighing 160 g/m². When used as prepreg, this carbon fibre fabric was treated with approximately 60 to 100 g/m² of the following mixture:

Isocyanurate: 71.0% by weight
Crude MDI: 7.0% by weight
(NH₄)₂HPO₄: 18.0% by weight
Crystalline K-silicate: 1.0% by weight
Pyrogenic silica: 3.0% by weight, Batch C could be cured at random to products with bulk densities of 180 to 500 kg/m³.

| | A | B | C | D |
|---|---|---|---|---|
| Isocyanurate (wt. %) | 50.0 | 65.0 | 60.0 | 50.0 |
| Crude MDI (wt. %) | 5.0 | 6.0 | 6.0 | 4.0 |
| (NH₄)₂HPO₄ (wt. %) | 13.0 | 15.0 | 14.0 | 13.0 |
| NH₄H₂PO₄ (wt. %) | — | 1.0 | — | 1.0 |
| Pyrogenic silica (wt. %) | 2.0 | 1.0 | 2.0 | 1.0 |
| Hollow glass microspheres d = 0.40 g/cm³ (wt. %) | 5.0 | 6.0 | — | 15.0 |
| Hollow glass microspheres (d = 0.15 g/cm³) (wt. %) | 2.0 | — | 5.0 | — |
| 55% Na—silicate solution, Na₂O:SiO₂ = 1:2 (wt. %) | — | — | 5.0 | — |
| Tin mercaptane compound (wt. %) | 0.5 | 1.0 | 2.0 | 1.0 |
| Water (wt. %) | 5.0 | 5.0 | — | — |
| Dimethylsiloxanealkyleneoxide (wt. %) | 0.5 | — | 1.0 | 0.5 |
| Triethylamine (wt. %) | — | — | 1.0 | 0.5 |
| Trichlorofluoromethane (wt. %) | 17.0 | — | 4.0 | — |
| Carbon fibres, length 3–6 mm (wt. %) | — | — | — | 4.0 |
| Bulk density (kg/m³) | 200 | 190 | 220 | 310 |

Products A, B and C fulfilled the requirements of ATS 1000.001 during the flame application test (1080° C., 5 minutes). Product D fulfilled these requirements after flame application for 7 minutes without prepreg. A 10 mm plate of product C without prepreg was still flame-stable after 10 minutes flame application.

I claim:

1. A one-component molding material based on polyisocyanato-isocyanurates and flameproofing and fireproofing agents as well as optionally polyisocyanates, fillers and promoters comprising:
   (A) 40 to 80% by weight of the isocyanurate of 1,6-hexamethylene diisocyanate with a NCO content of 18 to 24% by weight,
   (B) 0 to 20% by weight of crude MDI and/or prepolymer of polyol and crude MDI and/or isophorone diisocyanate optionally in combination with dimerized triazine of TDI, copolymerized triazine of TDI and HDI and/or naphthalene diisocyanate,
   (C) 5 to 20% by weight of a mixture of:
      (a) 50 to 100% by weight of secondary ammonium phosphate, with the proviso that the amount of secondary ammonium phosphate is 80 to 100% by weight if component C is only present in an amount of 5 to 10% by weight,
(b) 0 to 20% by weight of primary ammonium phosphate,
(c) 0 to 20% by weight of zeolite and/or crystalline alkali silicate,
(d) 0 to 20% by weight of finely divided silica,
(e) 0 to 20% by weight of $Ca_3(PO_4)_2$,
(f) 0 to 20% by weight azodicarbonamide,
(g) 0 to 20% by weight calcined calcium oxide,
(D) 0 to 50% by weight of filler and
(E) 0 to 5% by weight promoter.

2. Molding material according to claim 1, wherein component B is present in an amount of 2 to 6% by weight.

3. Molding material according to claim 1, wherein secondary ammonium phosphate is present in component C in an amount of 80 to 100% by weight.

4. Molding material according to claim 1, wherein component C overall and preferably also each of its mixing components (a) to (g) have a particle size distribution such that 50 to 70% by weight have a size of 20 to 50 μm, no more than 30% by weight a size of less than 20 μm and no more than 50% by weight a size in the range of 50 to 100 μm.

5. Molding material according to claim 1, wherein component C is a mixture of secondary ammonium phosphate, crystalline alkali silicate, pyrogenic silica and $Ca_3(PO_4)_2$.

6. Molding material according to claim 1, wherein component D comprises one or more fillers selected from the group consisting of fly ash, silica, $B_4C$, hollow glass microspheres, hollow phenolic resin microspheres, carbon fibres, pre-ox fibres, glass fibres, metal fibres, aluminum flakes, cobweb-whiskers, melamin resin powders and foamed clays.

7. Molding material according to claim 6, wherein the hollow microspheres are filled with non-flammable or fire-extinguishing gases.

8. Molding material according to claim 6, wherein the carbon fibres or pre-ox fibres have a thickness of 0.001 to 0.1 mm and a length of 0.005 to 50 mm and particularly 0.1 to 5 mm.

9. Use of the molding material according to claim 1 as construction material, especially fire protection construction material.

10. Use according to claim 9, wherein the construction material is used for the manufacture of molded components and plate elements for the construction of land, air and water vehicles.

* * * * *